United States Patent
Yahiaoui

[11] Patent Number: 5,957,494
[45] Date of Patent: Sep. 28, 1999

[54] APPARATUS AND METHOD FOR IMPROVING THE LATERAL STABILITY OF VEHICLES

[75] Inventor: Mohamed Yahiaoui, Hagerstown, Md.

[73] Assignee: JLG Industries, Inc., McConnellsburg, Pa.

[21] Appl. No.: 08/890,863

[22] Filed: Jul. 10, 1997

[51] Int. Cl.[6] .............................. B60C 17/04; B60R 21/13
[52] U.S. Cl. ........................ 280/755; 301/40.3; 152/520
[58] Field of Search ..................... 280/755, 759, 280/757, 767; 301/40.3, 40.2, 39.1; 152/520, 158

[56] References Cited

U.S. PATENT DOCUMENTS

| | | | |
|---|---|---|---|
| 1,419,350 | 6/1922 | Beers . | |
| 2,447,225 | 8/1948 | Bennett | 301/38.1 |
| 2,879,821 | 3/1959 | DeMayo | 152/158 |
| 2,973,209 | 2/1961 | Shaw | 280/755 |
| 3,142,326 | 7/1964 | Lindley | 152/158 |
| 3,866,978 | 2/1975 | Fine | 301/40.3 |
| 3,968,825 | 7/1976 | Mitchell et al. | 152/158 |
| 4,157,726 | 6/1979 | Brewer | 152/520 |
| 4,158,468 | 6/1979 | Bass et al. | 301/40.3 |
| 4,424,842 | 1/1984 | Trebaol | 152/158 |
| 4,461,333 | 7/1984 | Filliol et al. | 152/520 |
| 4,572,260 | 2/1986 | Ordu | 152/158 |
| 5,000,518 | 3/1991 | Markow | 301/40.3 |
| 5,141,039 | 8/1992 | Tansei et al. | 152/520 |
| 5,551,762 | 9/1996 | Roopngam | 301/40.3 |
| 5,593,520 | 1/1997 | Boni et al. | 152/158 |

FOREIGN PATENT DOCUMENTS

90/2717  4/1990  South Africa .

OTHER PUBLICATIONS

"Automotive Materials," *Design News*, dated Oct. 7, 1996.
"Trucksaver" Brochure (date unknown).
Hutchinson brochure for "Run–Flat" (date unknown).

*Primary Examiner*—Peter C. English
*Attorney, Agent, or Firm*—Reed Smith Shaw & McClay LLP

[57] ABSTRACT

An apparatus includes a vehicle having at least one tire mounted on a support member. The tire has a centerline that substantially defines a first tipline of the vehicle. A device, which has a diameter that is smaller than the diameter of the tire, is attached to the support member. The device includes a contact surface having a centerline that substantially defines a second tipline of the vehicle. When the tire is loaded and deflects such that the device interacts with a support surface, the tipline of the vehicle is moved from the first tipline to the second tipline to improve the stability of the vehicle.

34 Claims, 10 Drawing Sheets

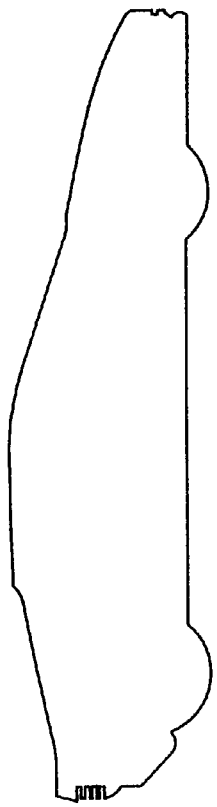
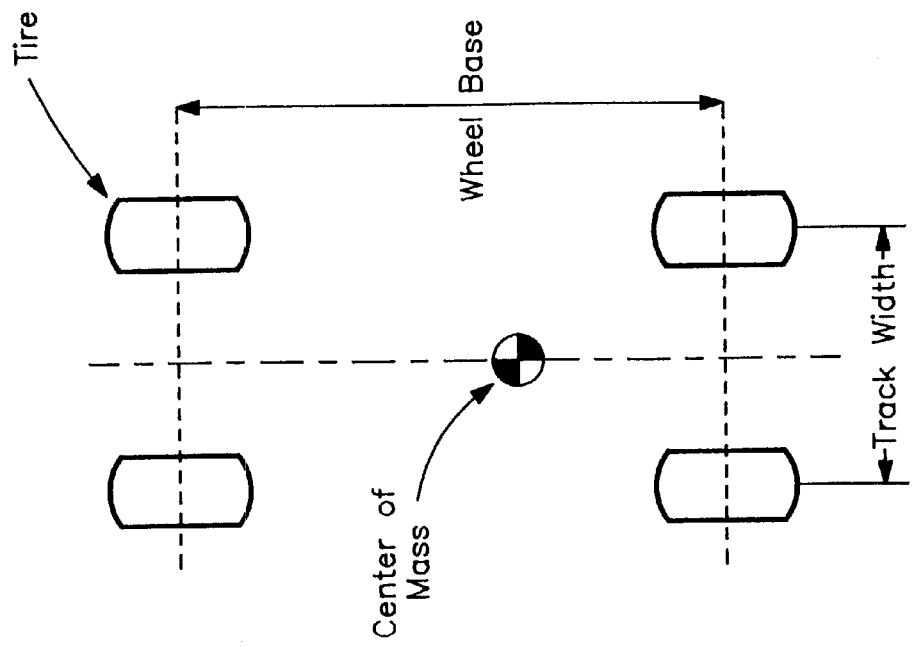
FIG. 1B PRIOR ART
FIG. 1A PRIOR ART

APPARATUS AND METHOD FOR IMPROVING THE LATERAL STABILITY OF VEHICLES

BACKGROUND OF THE INVENTION

The present invention relates generally to vehicles and machines that experience shifting centers of mass during use and, more particularly, to an apparatus and method for improving the stability of such vehicles.

To provide favorable ride, handling and traction, most automobiles and similar vehicles have their lateral centers of mass located at some point substantially along the longitudinal axes thereof. (See FIGS. 1A and 1B.) However, other vehicles, such as excavators, boom lifts and other machines, have centers of mass that move significantly during use. (See FIGS. 2A–2C.)

For example, as the boom of a boom lift is extended and a load is applied to the platform or bucket thereof, the lift's center of mass moves outwardly toward the supporting wheels or tracks. (See FIG. 3.) If a sufficient load is applied to the boom, the center of mass will move beyond the wheels and the lift will tip over. The imaginary line along a support surface (e.g., the ground) about which a vehicle tips has been denominated the "tipline."

By defining the tipline of a vehicle as near to the perimeter of the vehicle's chassis as possible, the stability of the vehicle is increased. This increase in stability permits the vehicle to perform its intended function with the minimum amount of necessary counterbalance weight, which results in lower costs, improved flotation on soft surfaces, easier transport, etc.

A standard vehicle has two lateral tiplines separated by a distance substantially equal to the track width thereof. Vehicles incorporating conventional tires tend to tip about a line defined substantially at the lateral centerline of the tires (i.e., where the tires contact the support surface). (See FIGS. 4A and 4B.)

To achieve maximum vehicle stability, narrow and stiff solid rubber tires are preferred on excavators and other similar machines. However, wide and soft pneumatic tires have typically been used instead to decrease the ground bearing pressure of narrow tires (i.e., to prevent damage to fragile surfaces or to improve vehicle flotation on soft surfaces), to allow the use of small diameter tires to provide clearance for rotating machine components while still providing adequate tire capacity, and to improve ride, comfort and traction.

In an attempt to balance the conflicting needs of vehicle stability on one hand and ride, comfort, flotation, load capacity and traction on the other hand, foam-filled and dual tires have been utilized.

Particularly in Europe, foam-filled tires are popular and widely used. These tires are typically formed by filling a standard pneumatic tire with a urethane foam. In the event of tire puncture, the urethane foam prevents the tire from deflating. Although foam-filled tires are not as costly as solid rubber tires, they possess all of the other disadvantages of solid rubber tires. Moreover, because the width and shape of foam-filled tires are the same as the original, pre-filled pneumatic tires, foam-filled tires do not provide as much vehicle stability as solid rubber tires.

As stated above, dual tires have also been used to improve vehicle stability. By employing dual tires, the tipline of a vehicle or machine is moved to the center of the outboard tire. (See FIG. 5.)

However, there is an inherent risk factor in using dual tires. If one tire of the pair is damaged during vehicle use, the other tire may be unintentionally overloaded. For example, if the outboard tire of a dual pair is deflated, the tipline of the vehicle is then defined at substantially the centerline of the inboard tire, which results in a less stable condition then if the vehicle were initially designed for only a single tire. Further, the use of dual tires results in the increased cost of installing and maintaining twice as many tires per vehicle.

It is worthwhile noting that two other devices, which have not been used to improve vehicle stability, have been developed for allowing vehicles to be operated on flat tires.

An external disk, which has a slightly smaller diameter than the respective tire of a vehicle, is mounted adjacent to and either inboard or outboard of the tire. If the tire is deflated, the disk supports the vehicle above the ground and allows it to be operated for a limited time (e.g., for emergencies) at restricted speeds. Such an external disk is disclosed in South African Patent No. 90/2717 and has been manufactured and sold in the Republic of South Africa by "Express Trailer Repairs" under the name "TRUCK-SAVER."

Further, Hutchinson and Rodgard Corporation have marketed an internal disk that allows deflated pneumatic tires to operate for a limited time at restricted speeds and/or distances. The disk is mounted to a tire's rim at the centerline thereof, and is sized to contact the inside of the tire when the tire deflates to approximately 50% of its normal height. This device does not increase the tipping stability of the vehicle because the disk, and thus the tipline, is still positioned at substantially the centerline of the tire and a large deflection (i.e., greater than 50% of the tire's height) is needed for the internal disk to contact the tire and thus the ground.

SUMMARY OF THE INVENTION

The present invention provides an apparatus and method for improving the stability of vehicles having shifting centers of mass while, at the same time, retaining the advantageous and desirable characteristics of pneumatic tires, including ride comfort, flotation, load capacity and traction.

According to a first aspect of the present invention, an internal device is mounted on a pneumatic tire's wheel assembly to improve a vehicle's stability. The tire performs like a normal pneumatic tire during normal vehicle use conditions. In this manner, the internal device does not influence the pneumatic tire's desired ride, traction, flotation, tire wear and other characteristics. However, when the tire is highly loaded (i.e., when the vehicle is in a near-tipping condition), the tire deflects sufficiently to allow the internal device to contact the inner surface thereof. Consequently, the tipline is moved from the centerline of the tire to the centerline of the internal device's contact surface. Further, in this operating mode, the tire functions as a cushion between the internal device and a support surface (e.g., the ground, deck, etc.), thereby decreasing the ground bearing pressure of the internal device.

According to a second aspect of the present invention, an external device is attached to a pneumatic tire's wheel assembly to improve a vehicle's stability. Like the internal device discussed directly above, the external device does not detrimentally influence the pneumatic tire's desired characteristics. However, when the tire is highly loaded, the tire deflects sufficiently to allow the external device to contact the support surface (e.g., the ground, deck, etc.). Consequently, the tipline is moved from the centerline of the tire to the centerline of the external device's contact surface.

According to a third aspect of the present invention, an apparatus includes a vehicle having at least one tire operatively associated with a support member. The tire has a centerline that substantially defines a first tipline of the vehicle. A device, which has a diameter that is smaller than the diameter of the tire, is attached to the support member. The device includes a contact surface having a centerline that substantially defines a second tipline of the vehicle. When the tire is loaded and deflects such that the device interacts with a support surface, the tipline of the vehicle is moved from the first tipline to the second tipline to improve the stability of the vehicle.

According to a fourth aspect of the present invention, a method of improving the stability of a vehicle includes the following steps: providing a vehicle having at least one tire operatively associated with a support member, the tire having a centerline that substantially defines a first tipline of the vehicle; providing a device, which has a diameter that is smaller than the diameter of the tire, including a contact surface having a centerline that substantially defines a second tipline of the vehicle; attaching the device to the support member; loading the vehicle such that the contact surface of the device interacts with a support surface to move a tipline of the vehicle from the first tipline to the second tipline.

According to a fifth aspect of the present invention, an apparatus includes a vehicle having at least one pneumatic tire mounted on a support member. The tire has a first diameter and a centerline that substantially defines a first tipline of the vehicle. A ring is operatively associated with the support member and is disposed within the tire. The ring has a width and an outside diameter that is smaller than the first diameter. Further, the ring includes a contact surface that is larger than the width thereof and has a centerline that substantially defines a second tipline of the vehicle. When the tire is loaded and deflects such that the ring interacts with a support surface, the tipline of the vehicle is moved from the first tipline to the second tipline to improve the stability of the vehicle.

According to a sixth aspect of the present invention, an apparatus includes a vehicle having a tire mounted on a support member. The tire has a first diameter and a centerline that substantially defines a first tipline of the vehicle. A disk is operatively associated with the support member and is disposed outside of the tire. The disk has a first width and an outside diameter that is smaller than the first diameter. Furthermore, the disk includes a contact surface having a second width that is larger than the first width thereof and a centerline that substantially defines a second tipline of the vehicle. When the tire is loaded and deflects to such an extent that the disk interacts with a support surface, the tipline of the vehicle is moved from the first tipline to the second tipline to improve the stability of the vehicle.

The present invention provides a vehicle that offers the advantages of pneumatic tires (i.e., improved ride, flotation and traction) as well as the advantage of improved vehicle stability that results from having devices that interact with a support surface and are associated with the tires near the perimeter of the vehicle's chassis.

The present invention, together with other aspects and attendant advantages thereof, will best be understood upon consideration of the following detailed description taken in conjunction with the appended drawings.

BRIEF DESCRIPTION OF THE DRAWINGS

FIG. 1A is a plan schematic view of a chassis for a conventional automobile.

FIG. 1B is an elevational schematic view of a conventional automobile.

DETAILED DESCRIPTION OF THE PRESENTLY PREFERRED EMBODIMENTS

It should be understood that the term "vehicle," as used herein, is intended to include any suitable stationary or mobile vehicles, machines or equipment, such as automobiles, excavators, back hoes, boom lifts, and the like.

The present invention is described below in terms of a single tire on a vehicle. However, it should be understood that the present invention may be utilized on some or all of the tires on a vehicle.

Turning now to the drawings, FIGS. 1A–5 were discussed above in the Background section of the application and may be referred to herein regarding the various embodiments of the present invention.

Figure 2B:
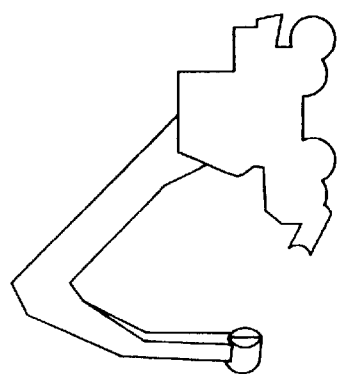
FIG. 2B is an elevational representation of a conventional excavator.
Figure 2C:
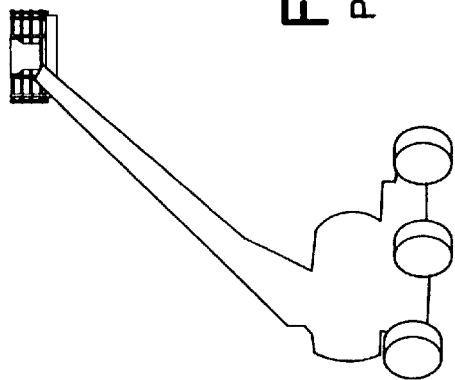
FIG. 2C is an elevational representation of a conventional boom lift.
Figure 2A:
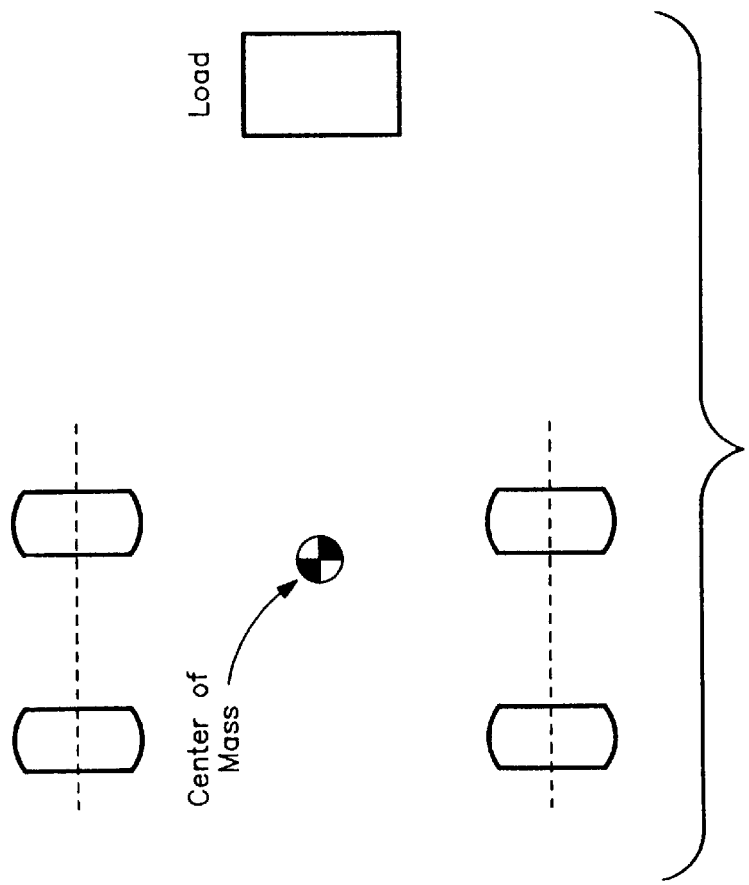
FIG. 2A is a plan schematic view of a chassis for a conventional load-bearing vehicle.
Figure 3:
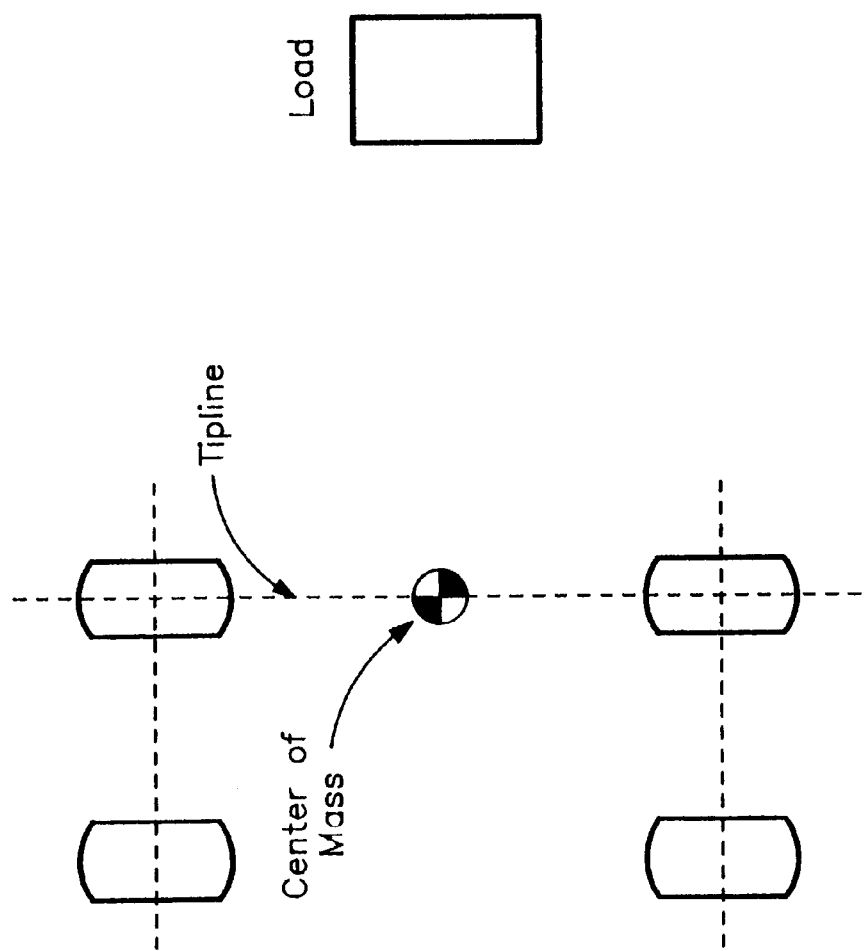
FIG. 3 is a plan schematic view of FIG. 2 when the vehicle's center of mass is located along the tipline and the vehicle is close to tipping.
Figure 4B:
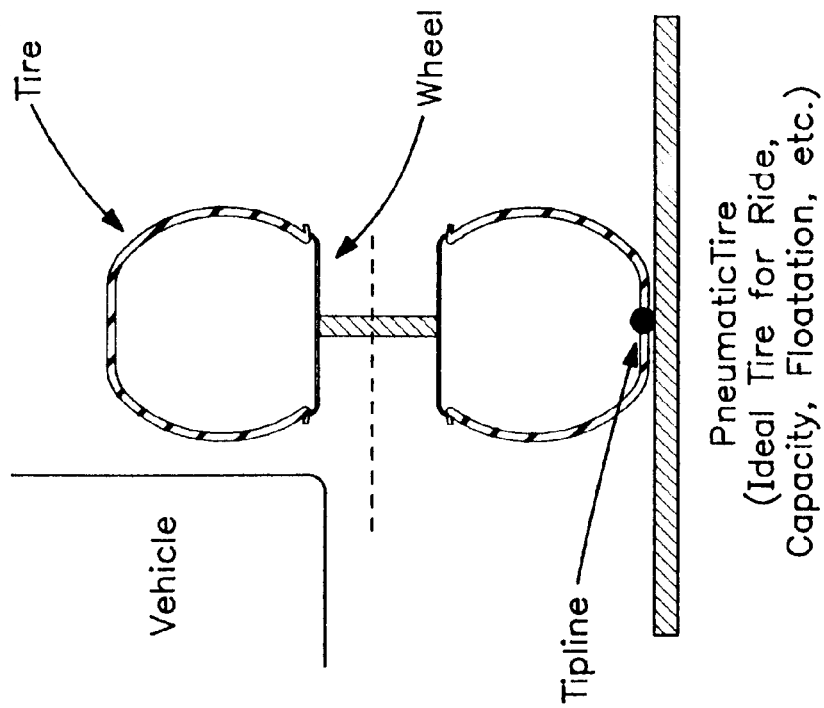
FIG. 4A is a sectional elevational view of a narrow and stiff solid-rubber tire for a vehicle and FIG. 4B is a sectional elevational view of a wide and soft pneumatic tire for a vehicle.
Figure 4A:
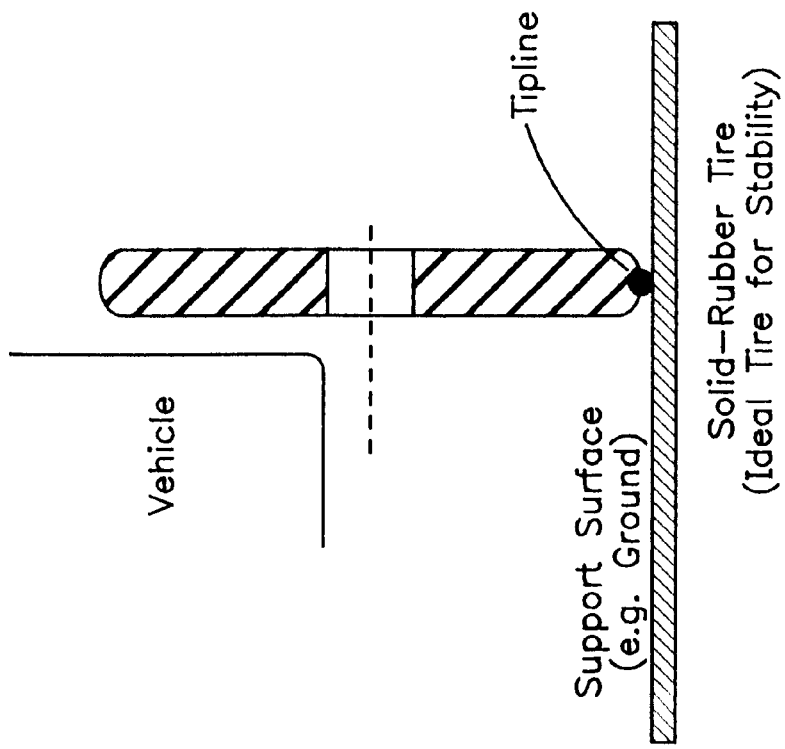
Figure 5:
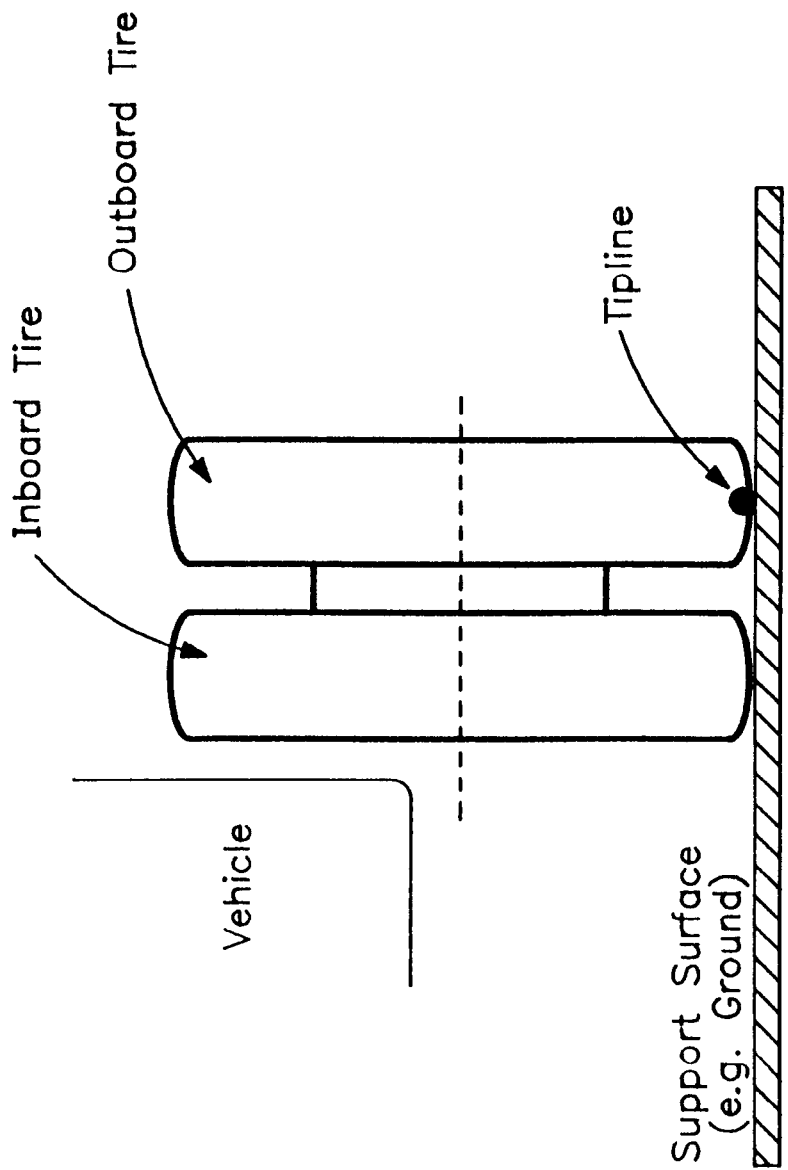
FIG. 5 is an elevational view of a set of dual tires for a vehicle.
Figure 6:
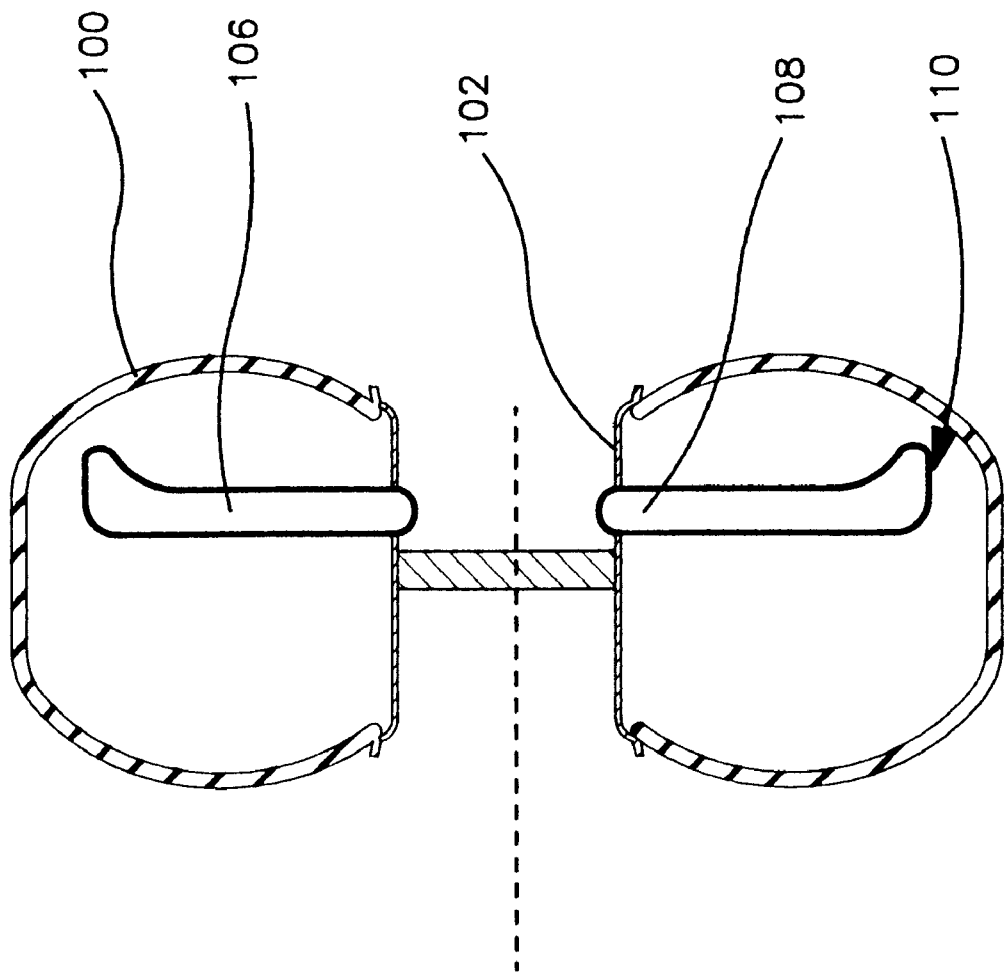
FIG. 6 is a sectional view of a first preferred embodiment of the apparatus of the present invention.

FIGS. 6–9F illustrate the first preferred embodiment of the present invention. As best shown in FIG. 6, a conventional pneumatic tire 100 is mounted to a wheel assembly 102.

In the preferred embodiment, a device or ring 106 is mounted to the wheel assembly 102 within the tire 100 in any suitable manner. Preferably, as shown in FIGS. 8A–9F, the ring 106 is donut-shaped and is formed in three arcuate portions or segments that are equally spaced along a 360 degree circle and that may be interconnected and mounted to the wheel assembly 102. The arcuate portions may be interconnected with one another via bolts or mechanically locked fasteners 107. The number of arcuate segments is a function of tire and wheel assembly size and ease of mounting. For example, the ring 106 could be formed of 1, 2, 4, 5 or more segments. Furthermore, the ring 106 may be formed and mounted to the wheel assembly 102 in any suitable manner.

Figure 7:
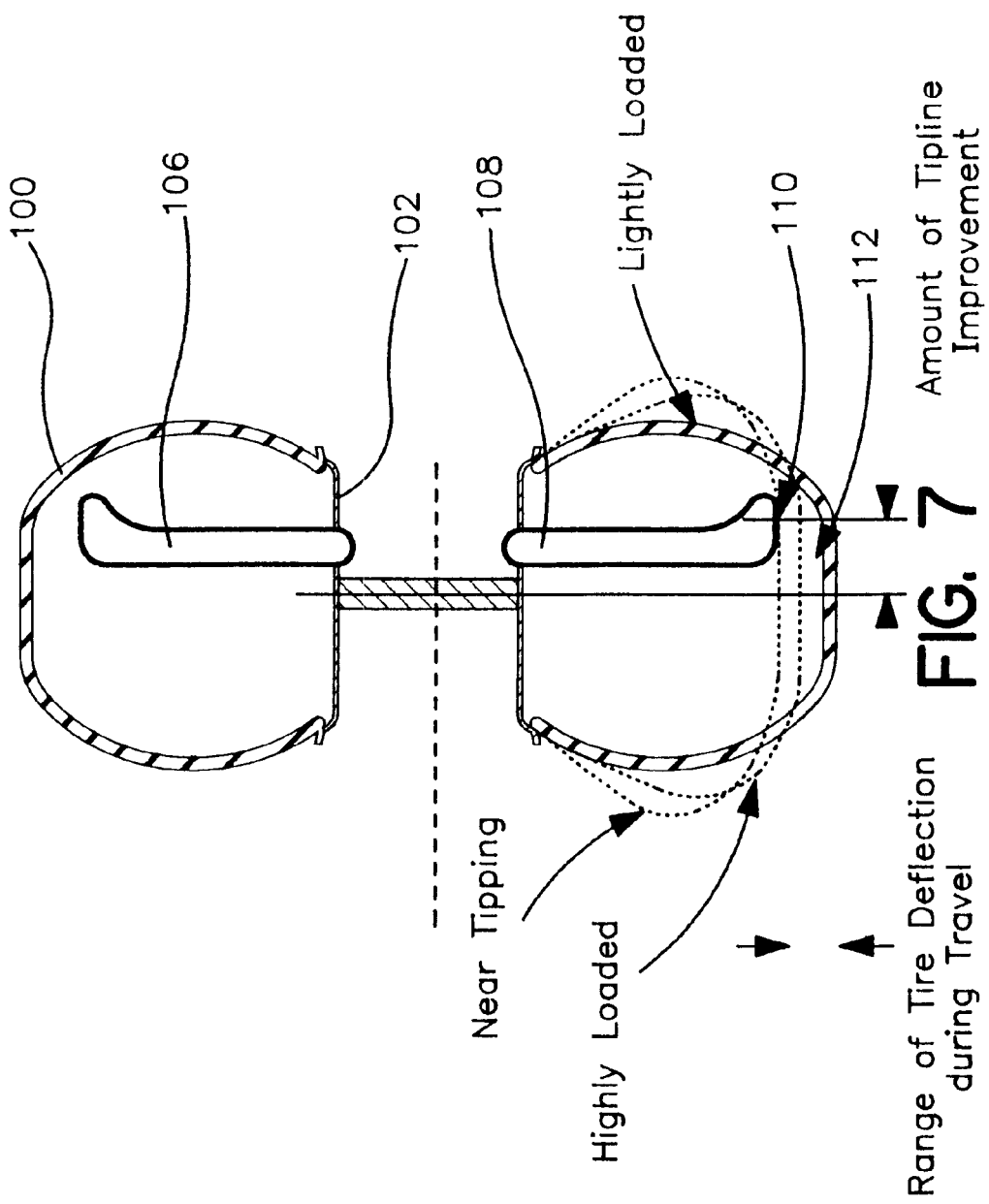
FIG. 7 is an operational view of the apparatus shown in FIG. 6.
Figure 8B:
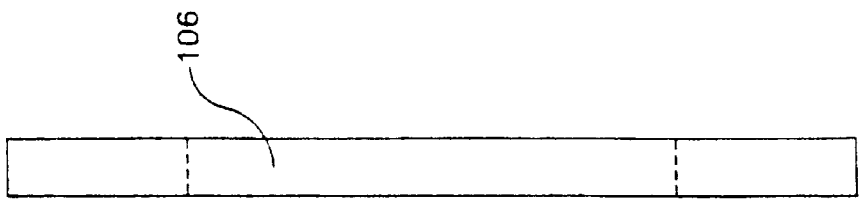
FIGS. 8A and 8B are assembled frontal and side views, respectively, of the apparatus shown in FIGS. 6 and 7.
Figure 8A:
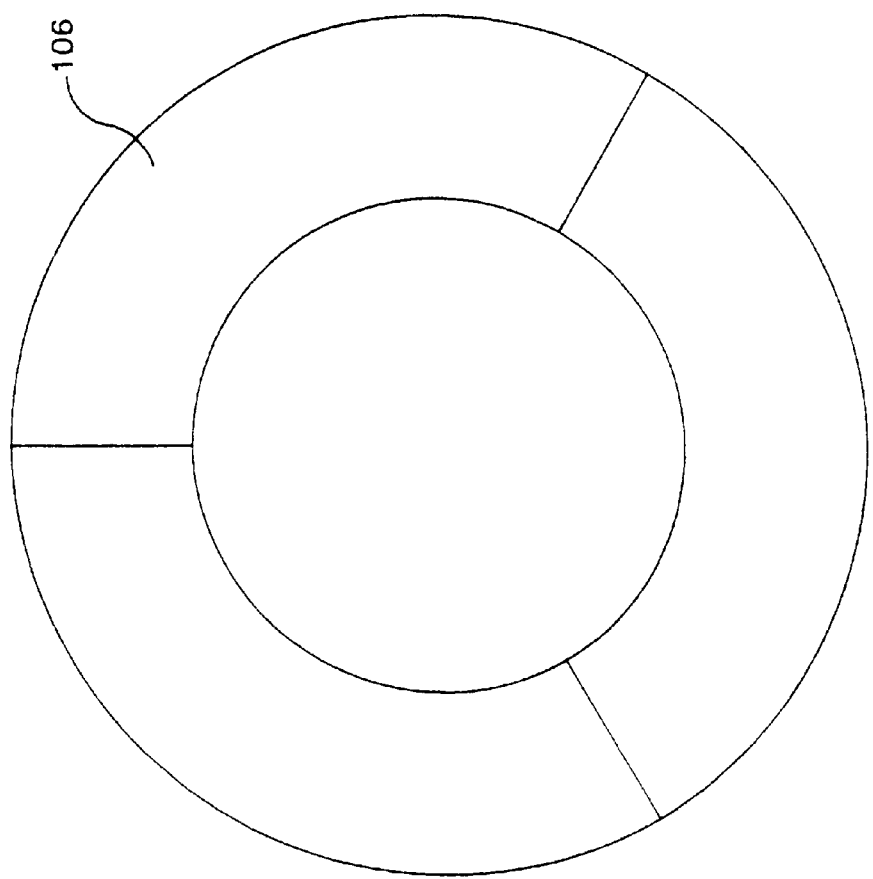
Figure 9A:
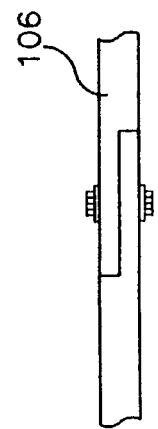
FIGS. 9A–9F are views respectively showing three methods of connecting the ring segments together.
Figure 9B:
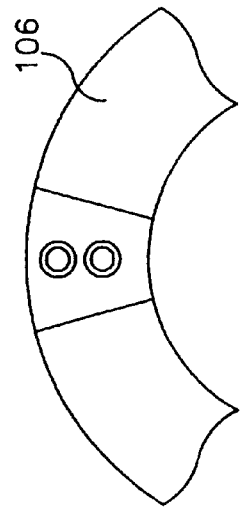
Figure 9C:
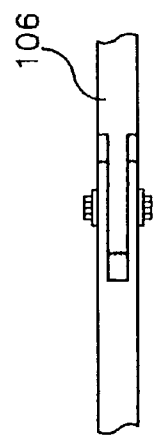
Figure 9D:
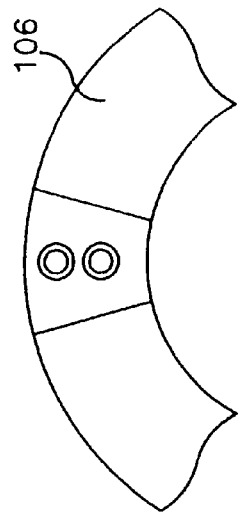
Figure 9E:
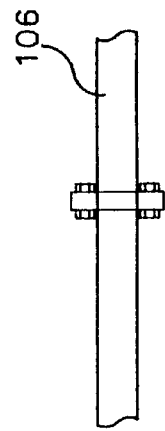
Figure 9F:
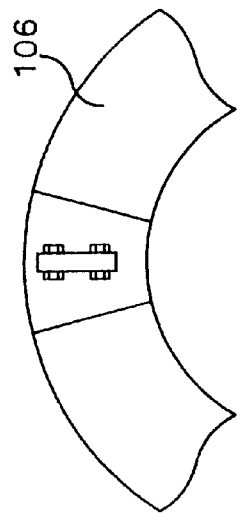

As shown in FIGS. 6 and 7, the ring 106 includes an inner or mounting portion 108 that transitions to an enlarged contact surface 110 along the outer periphery thereof. Preferably, the contact surface 110 may be approximately twice as wide as the width of the inner portion 108. However, the inner portion 108 and the contact surface 110 may have any suitable width dimensions.

The ring 106 is preferably mounted on the wheel assembly 102 at a position offset from the centerline thereof to improve vehicle stability. As discussed above, the centerline of the tire 100 substantially defines a first tipline of the vehicle. Likewise, as best shown in FIG. 7, the centerline of the contact surface 110 substantially defines a second, improved tipline.

The ring 106 may be positioned at any location between the centerline and the outer edge of the wheel assembly 102. As discussed in more detail below, the stability of the vehicle improves in relation to the distance between the centerline of the tire 100 and the location of the contact surface 110.

In a preferred embodiment, the contact surface 110 of the ring 106 is located as far outboard of the wheel assembly 102 as possible while still remaining within the tire 100. Furthermore, while the inner portion 108 of the ring 106 may be mounted at any suitable location on the wheel assembly 102, the contact surface 110 may be located as far outboard as possible, resulting in a ring 106 that may be curved or non-linear.

As shown in FIGS. 6 and 7, the diameter of the ring 106 is smaller than the normal operating diameter of the tire 100. The performance characteristics of the tire 100 during normal vehicle use (i.e., when lightly-loaded or during normal travel) may be analyzed to determine the normal deflection range of the tire 100. By correspondingly sizing the diameter of the ring 106 to prevent the ring 106 from contacting the inner surface 112 of the tire 100 during normal vehicle use, the desirable ride, comfort, traction and other characteristics of the tire 100 will not be compromised by the ring 106.

However, as best shown in FIG. 7, when the tire 100 is highly-loaded due to the vehicle's center of mass approaching the tipline, the tire 100 deflects to such an extent that the contact surface 110 of the ring 106 contacts the inner surface 112 of the tire 100, and thus interacts with the ground or other support surface. When the contact surface 110 of the ring 106 interacts with the ground, the tipline of the vehicle is transferred from substantially the centerline of the tire 100 to substantially the centerline of the contact surface 110, thereby improving the stability of the vehicle in this condition.

After the load is removed from the tires and the vehicle is in its normal operating mode, the tire 100 will substantially regain its normal operating diameter and the contact surface 110 of the ring 106 will disengage the inner surface 112 of the tire 100. Consequently, the tipline of the vehicle will return to substantially the centerline of the tire 100.

Figure 10:
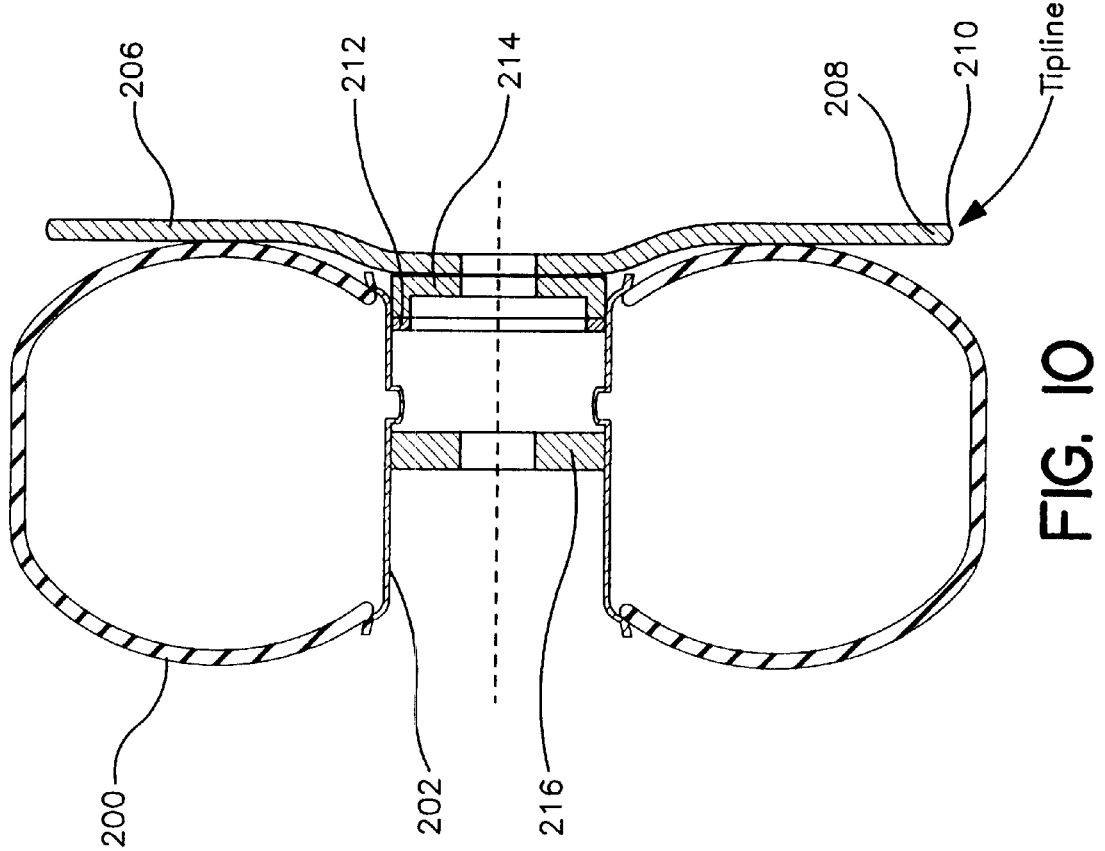
FIG. 10 is a sectional view of a second preferred embodiment of the apparatus of the present invention.

The second preferred embodiment of the present invention is illustrated in FIG. 10. As shown therein, a conventional pneumatic tire 200 is mounted to a wheel assembly 202. Alternately, a solid rubber or other suitable tire may be utilized.

An external device or disk 206 is attached to the wheel assembly 202 by any suitable means. For example, the disk 206 may be attached to the wheel assembly 202 by means of the same fasteners that attach the wheel assembly 202 to the vehicle (i.e., by means of an adapter that occupies the space between the disk 206 and the wheel mounting flange 216).

If, however, an obstruction in the wheel assembly 202 prevents such a mounting, the disk 206 may be mounted to the wheel rim. For example, as shown in FIG. 10, a separate ring 212 is welded to the rim near the bead. An adapter 214 is bolted to the ring and is removable for access to the wheel assembly mounting bolts and other components. The disk 206 is, in turn, bolted to the adapter 214.

Preferably, the external disk 206 is a substantially solid disk. However, any suitable donut-shaped disk or other device may be attached to the wheel assembly 202.

As shown in FIG. 10, the external disk 206 has a substantially constant width and includes an edge 208 that defines a contact surface 210. In an alternate embodiment, similar to the disk 106 shown in FIGS. 6–9, the edge 208 may define an enlarged contact surface 210.

The disk 206 is preferably attached to the wheel assembly 202 at a position outboard of the tire 200 to improve vehicle stability. As discussed above, the centerline of the tire 200 substantially defines a first tipline of the vehicle. Likewise, as shown in FIG. 10, the centerline of the contact surface 210 substantially defines a second, improved tipline.

The diameter of the external disk 206 is smaller than the normal operating diameter of the tire 200. As discussed above with respect to the first preferred embodiment, the diameter of the external disk 206 is sized to prevent the disk 206 from contacting the ground or other support surface during normal vehicle use.

When the tire is highly-loaded due to the vehicle's center of mass approaching the tipline, the tire 200 deflects to such an extent that the contact surface 210 of the disk 206 contacts the ground or other support surface. When the contact surface 210 of the disk 206 contacts the ground, the tipline of the vehicle is transferred from substantially the centerline of the tire 200 to substantially the centerline of the contact surface 210, thereby improving the stability of the vehicle in this condition.

After the load is removed from the tires and the vehicle is in its normal operating mode, the contact surface 210 of the disk 206 disengages the ground or other support surface. Consequently, the tipline of the vehicle will return to substantially the centerline of the tire 200.

In an alternate embodiment, the external disk 206 may be attached to the wheel assembly 202 by means of an adjustable telescoping member (not shown). In this embodiment, the disk 206 may be positioned in a variety of positions outboard of the tire 200 to improve the vehicle's stability.

As described above, the present invention provides an apparatus and method for improving the stability of vehicles, including automobiles, excavators, boom lifts and the like. By attaching a disk-like device to the wheel assembly of a tire, the tipline of the vehicle may be moved closer to, or even beyond, the perimeter of the vehicle's chassis.

It should be understood that the tires 100 and 200 disclosed herein could alternatively be embodied by something other than a pneumatic tire such as, for example, a semi-pneumatic tire.

It should be appreciated that the present invention may be modified or configured as appropriate for the application. The embodiments described above are to be considered in all respects only as illustrative of the present invention, and not restrictive. The scope of the invention is indicated by the following claims rather than by the foregoing description. All changes which come within the meaning and range of equivalency of the claims are to be embraced within their scope.

What is claimed is:

1. A method of altering the stability of a vehicle, comprising the following steps:

providing a vehicle comprising at least one tire operatively associated with a support member, the at least one tire comprising a first diameter and a centerline that substantially defines a first tipline of the vehicle;

providing at least one device having a second diameter that is smaller than the first diameter, the at least one device comprising a contact surface having a centerline that substantially defines a second tipline of the vehicle;

attaching the at least one device to the support member in a manner to improve vehicle stability in response to a load that causes the vehicle's center of mass to approach the first tipline;

loading the at least one tire so as to cause the vehicle's center of mass to approach the first tipline and such that, responsive to such loading, the tire deflects to an extent that the contact surface of the at least one device interacts with a support surface to move a tipline of the vehicle from the first tipline to the second tipline.

2. The method of claim 1 wherein the at least one device comprises a member selected from the group consisting of a disk and a ring.

3. The method of claim 1 wherein the at least one device comprises one or more segments.

4. The method of claim 1 wherein the at least one tire comprises a pneumatic or semi-pneumatic tire.

5. The method of claim 4 wherein the at least one device is mounted to the support member and is disposed within the tire.

6. The method of claim 5 wherein the at least one device is mounted to the support member at a position offset from the centerline thereof.

7. The method of claim 5 wherein the at least one device interacts with the support surface via the tire.

8. The method of claim 1 wherein the support member comprises a rim.

9. The method of claim 1 wherein the at least one device is attached to the support member and is disposed external to the tire.

10. The method of claim 1 wherein the contact surface is offset from an inner portion of the at least one device.

11. The method according to claim 1, wherein said vehicle comprises a boom lift.

12. An apparatus comprising:
a vehicle comprising at least one tire operatively associated with a support member, the at least one tire having a first diameter and a centerline that substantially defines a first tipline of the vehicle; and
a device attached to the support member of the at least one tire in such a manner as to improve vehicle stability in response to a load that causes the vehicle's center of mass to approach the first tipline, the device having a second diameter that is smaller than the first diameter and comprising a contact surface having a centerline that substantially defines a second tipline of the vehicle;
whereby a tipline of the vehicle is moved from the first tipline to the second tipline to improve the stability of the vehicle responsive to the at least one tire being loaded so as to cause the vehicle's center of mass to approach the first tipline and whereby the at least one tire deflects to such an extent that the device interacts with a support surface.

13. The apparatus of claim 12 wherein the at least one tire comprises four tires.

14. The apparatus of claim 12 wherein the width of the contact surface is substantially equal to the width of an inner portion of the device.

15. The apparatus of claim 14 wherein the contact surface is offset from the inner portion.

16. The apparatus of claim 12 wherein the device comprises a disk or a ring.

17. The apparatus of claim 12 wherein the device comprises one or more segments.

18. The apparatus of claim 12 wherein the at least one tire comprises a pneumatic or semi-pneumatic tire.

19. The apparatus of claim 18 wherein the device is mounted to the support member and is disposed within the tire.

20. The apparatus of claim 19 wherein the device is mounted to the support member at a position offset from the centerline thereof.

21. The apparatus of claim 19 wherein the contact surface of the device is located near the perimeter of the vehicle.

22. The apparatus of claim 19 wherein the device interacts with the support surface via the tire to move the tipline of the vehicle from the first tipline to the second tipline.

23. The apparatus of claim 12 wherein the device is attached to the support member and is disposed external to the tire.

24. The apparatus of claim 12 wherein the support member comprises a wheel.

25. The apparatus according to claim 12, wherein said vehicle comprises a boom lift.

26. An apparatus comprising:
a vehicle comprising at least one tire mounted on a support member, the at least one tire having a first diameter and a centerline that substantially defines a first tipline of the vehicle; and
a ring operatively associated with the support member and disposed within the at least one tire in such a manner as to improve vehicle stability in response to a load that causes the vehicle's center of mass to approach the first tipline, the ring having a width and an outside diameter that is smaller than the first diameter, the ring comprising a contact surface that is larger than the width thereof and having a centerline that substantially defines a second tipline of the vehicle;
whereby a tipline of the vehicle is moved from the first tipline to the second tipline to improve the stability of the vehicle responsive to the at least one tire being loaded so as to cause the vehicle's center of mass to approach the first tipline and whereby said at least one tire deflects to such an extent that the ring interacts with a support surface.

27. The apparatus of claim 26 wherein the ring further comprises an inner portion operatively associated with the support member.

28. The apparatus of claim 27 wherein the inner portion of the ring is mounted to the support member at a position offset from a centerline thereof.

29. The apparatus of claim 27 wherein at least a portion of the contact surface of the ring is offset from the inner portion thereof.

30. The apparatus of claim 26 wherein the support member comprises a wheel.

31. The apparatus according to claim 26, wherein said vehicle comprises a boom lift.

32. An apparatus comprising:
a vehicle comprising at least one tire mounted on a support member, the at least one tire having a first diameter and a centerline that substantially defines a first tipline of the vehicle; and
a disk operatively associated with the support member and disposed without the at least one tire in such a manner as to improve vehicle stability in response to a load that causes the vehicle's center of mass to approach the first tipline, the disk having a width and an outside diameter that is smaller than the first diameter, the disk comprising a contact surface and a centerline that substantially defines a second tipline of the vehicle;

whereby a tipline of the vehicle is moved from the first tipline to the second tipline to improve the stability of the vehicle responsive to the at least one tire being loaded so as to cause the vehicle's center of mass to approach the first tipline and whereby said at least one tire deflects to such an extent that the disk interacts with a support surface.

33. The apparatus of claim 32 wherein the support member comprises a wheel.

34. The apparatus according to claim 32, wherein said vehicle comprises a boom lift.

\* \* \* \* \*

UNITED STATES PATENT AND TRADEMARK OFFICE
CERTIFICATE OF CORRECTION

PATENT NO.: 5,957,494

DATED: September 28, 1999

INVENTOR(S): Yahiaoui

It is certified that an error appears in the above-identified patent and that said Letters Patent is hereby corrected as shown below:

Column 7, line 15, in Claim 1, insert --such-- between "to" and "an".

Signed and Sealed this

Thirtieth Day of May, 2000

Attest:

Q. TODD DICKINSON

*Attesting Officer*           *Director of Patents and Trademarks*